(No Model.)
S. A. & D. H. RICHARDSON.
COMBINED SAW SET, GAGE, AND JOINTER.
No. 580,508. Patented Apr. 13, 1897.
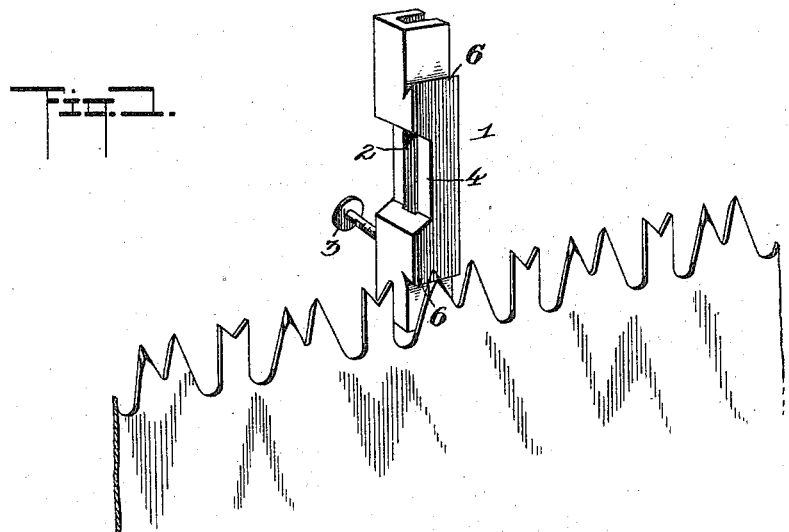
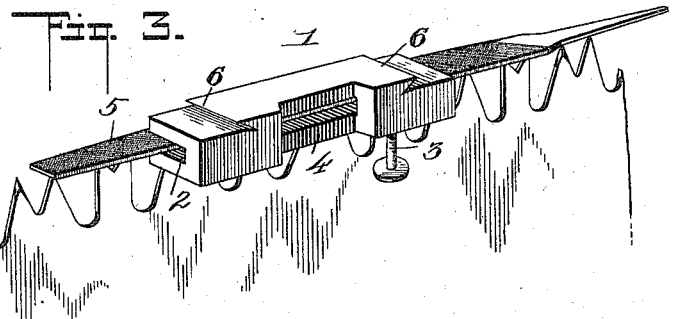
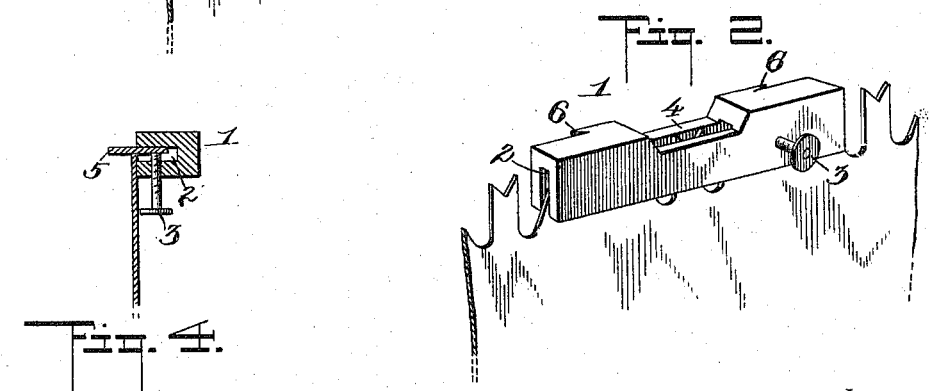
Inventors
Samuel A. Richardson
Daniel H. Richardson,
Witnesses
By their Attorneys,

UNITED STATES PATENT OFFICE.

SAMUEL A. RICHARDSON AND DANIEL H. RICHARDSON, OF GALION, OHIO.

COMBINED SAW SET, GAGE, AND JOINTER.

SPECIFICATION forming part of Letters Patent No. 580,508, dated April 13, 1897.

Application filed July 24, 1896. Serial No. 600,412. (No model.)

*To all whom it may concern:*

Be it known that we, SAMUEL A. RICHARDSON and DANIEL H. RICHARDSON, citizens of the United States, residing at Galion, in the county of Morrow and State of Ohio, have invented a new and useful Combined Saw Set, Gage, and Jointer, of which the following is a specification.

The invention relates to improvements in combined saw sets, gages, and jointers.

The object of the present invention is to provide a simple and inexpensive device which will enable the teeth of a saw to be accurately set and sharpened.

The invention consists in the construction and novel combination and arrangement of parts hereinafter fully described, illustrated in the accompanying drawings, and pointed out in the claim hereto appended.

In the drawings, Figure 1 is a perspective view of a device constructed in accordance with this invention and showing the same arranged on a saw for setting the teeth thereof. Fig. 2 is a similar view showing the device arranged on a saw for enabling the clearing-teeth to be reduced to the proper height relative to the cutting-teeth. Fig. 3 is a perspective view showing the device arranged as a jointer. Fig. 4 is a transverse sectional view of the same.

Like numerals of reference designate corresponding parts in all the figures of the drawings.

1 designates a gage constructed of suitable material and consisting of an oblong body provided with a longitudinal groove 2, adapted to receive the teeth of a saw to enable the gage to be arranged on the latter, as illustrated in Fig. 2 of the accompanying drawings. The gage is provided at one side with a clamping-screw 3, adapted to engage the saw, and having an extended threaded stem passing through a perforation of the adjacent side of the gage.

The top of the gage is provided with a recess 4, intersecting the longitudinal groove and having its bottom arranged in a horizontal plane slightly below that of the top wall of the groove, and adapted, when the gage is arranged on a saw, as illustrated in Fig. 2 of the accompanying drawings, to expose the clearing-teeth thereof to enable the same to be cut down to the proper height relative to the cutting-teeth after the latter have been made uniform, as hereinafter described. The recess enables the clearing-teeth to be readily filed down slightly below the upper wall of the groove, against which the points of the cutting-teeth bear when the gage is mounted on the saw, as above set forth.

The longitudinal groove of the gage is adapted to receive a file 5, as illustrated in Figs. 3 and 4 of the accompanying drawings. The lower edge of one of its sides forms a guide for the file when the latter is arranged on the top of the cutting-teeth, and the clamping-screw 3, which depends from the gage when the latter is arranged in this position, has its head arranged on the line with the bottom edges of the body and is thereby adapted as a guide to enable the file to be accurately manipulated. After the cutting-teeth have been made uniform they are filed sufficiently to sharpen them without further reducing their height.

The gage at the side opposite that occupied by the clamping-screw is reduced at its ends to form shoulders 6, which are disposed at an angle and which are brought to an inclination when the gage is arranged substantially vertically thereof, as illustrated in Fig. 1 of the accompanying drawings. Each recess which forms opposite shoulders is slightly depressed beneath the shoulders, as shown, and when the gage is arranged as illustrated in Fig. 1 the cutting-teeth of the saw may be readily and accurately set by a light blow from a hammer or mallet.

It will be seen that the combined saw set, gage, and jointer is simple and inexpensive in construction, that it is adapted to enable the teeth of a saw to be uniformly and accurately sharpened and set, and that it forms a guide for a file in reducing the cutting-teeth to render them uniform.

What we claim is—

A device of the class described comprising a body provided with a longitudinal groove and having a recess at its top intersecting the groove, said device having one of its side faces recessed at its ends and forming oppositely-disposed transverse angular shoulders 6, and a set-screw mounted on one side of the device, provided with an extended shank and having a head arranged in line with the bottom edges of the body, whereby the said
5 screw is adapted to serve as a guide, when a file is arranged in the groove, substantially as described.

In testimony that we claim the foregoing as our own we have hereto affixed our signatures in the presence of two witnesses.

SAMUEL A. RICHARDSON.
DANIEL H. RICHARDSON.

Witnesses:
R. E. COLES,
THOS. E. DUNCAN.